(12) United States Patent
de Dinechin

(10) Patent No.: US 7,577,944 B2
(45) Date of Patent: Aug. 18, 2009

(54) UNBUNDLING, TRANSLATION AND REBUNDLING OF INSTRUCTION BUNDLES IN AN INSTRUCTION STREAM

(75) Inventor: Christophe de Dinechin, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 10/100,525

(22) Filed: Mar. 18, 2002

(65) Prior Publication Data
US 2003/0177482 A1 Sep. 18, 2003

(51) Int. Cl.
*G06F 9/45* (2006.01)
(52) U.S. Cl. .................................... 717/136
(58) Field of Classification Search ............. 711/6–207; 709/248; 713/1; 717/130–158, 127; 712/23–233, 712/239
See application file for complete search history.

(56) References Cited

U.S. PATENT DOCUMENTS

| | | | |
|---|---|---|---|
| 5,870,599 A * | 2/1999 | Hinton et al. ............... | 712/239 |
| 5,922,065 A * | 7/1999 | Hull et al. .................... | 712/24 |
| 5,941,977 A * | 8/1999 | Panwar et al. ................ | 712/23 |
| 6,269,438 B1 * | 7/2001 | Chang ......................... | 712/233 |
| 6,446,189 B1 * | 9/2002 | Zuraski et al. .............. | 711/207 |
| 6,658,578 B1 * | 12/2003 | Laurenti et al. ............. | 713/324 |
| 6,732,220 B2 * | 5/2004 | Babaian et al. ............... | 711/6 |
| 6,735,679 B1 * | 5/2004 | Herbst et al. ................ | 711/167 |
| 6,748,451 B2 * | 6/2004 | Woods et al. ............... | 709/248 |
| 6,769,058 B1 * | 7/2004 | Ellison et al. ................ | 713/1 |
| 6,772,413 B2 * | 8/2004 | Kuznetsov ................... | 717/136 |
| 6,826,748 B1 * | 11/2004 | Hohensee et al. ........... | 717/130 |
| 6,950,926 B1 * | 9/2005 | Menezes ..................... | 712/216 |
| 6,988,183 B1 * | 1/2006 | Wong ......................... | 712/208 |
| 2002/0108103 A1 * | 8/2002 | Nevill ........................ | 717/139 |
| 2002/0156977 A1 * | 10/2002 | Derrick et al. .............. | 711/118 |
| 2004/0015878 A1 * | 1/2004 | Saito .......................... | 717/127 |
| 2004/0015931 A1 * | 1/2004 | Larin et al. .................. | 717/158 |
| 2005/0086650 A1 * | 4/2005 | Yates et al. .................. | 717/139 |

OTHER PUBLICATIONS

John E. Derrick, Virtual Caching of Regenerable Data, Oct. 24, 2002.*

* cited by examiner

*Primary Examiner*—Lewis A Bullock, Jr.
*Assistant Examiner*—Jue S Wang

(57) ABSTRACT

Instructions in a first instruction stream are unbundled; certain unbundled instructions are translated; and the instructions are rebundled. Bundled instructions are used by processors based on Very Long Instruction Word (VLIW) and Explicitly Parallel Instruction Computing (EPIC) technology.

41 Claims, 2 Drawing Sheets

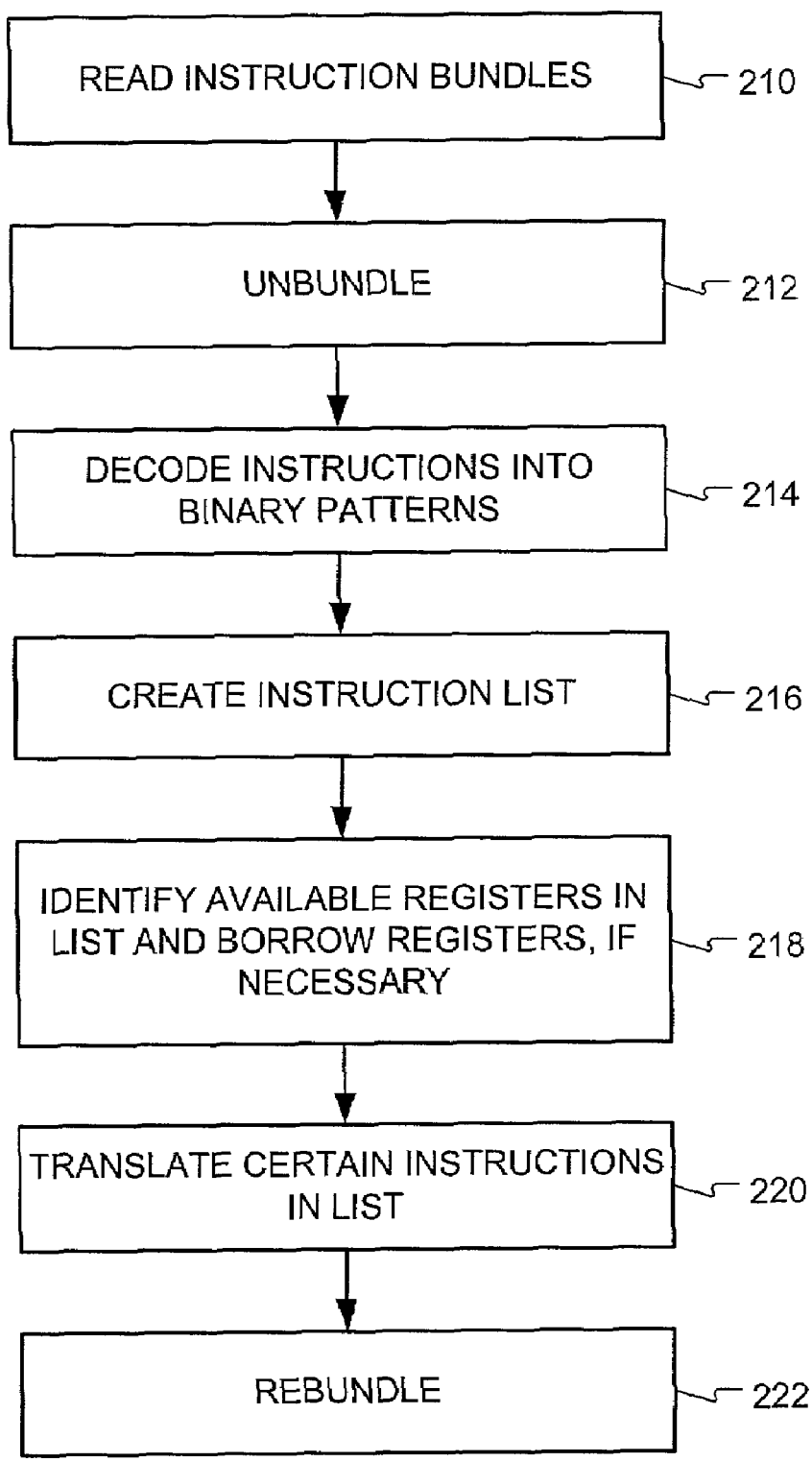

UNBUNDLING, TRANSLATION AND REBUNDLING OF INSTRUCTION BUNDLES IN AN INSTRUCTION STREAM

BACKGROUND

The IA-64 processor is a 64-bit processor that is based on Explicitly Parallel Instruction Computing (EPIC) technology. EPIC allows multiple instructions to be processed in parallel, which increases processor performance over conventional technologies such as Reduced Instruction Set Computing (RISC) and Complex Instruction Set Computing (CISC).

SUMMARY

According to one aspect of the present invention, instructions in a first instruction stream are unbundled; certain unbundled instructions are translated; and the instructions are rebundled. Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 2 is an illustration of a method for processing an instruction stream in accordance with an embodiment of the present invention.

DETAILED DESCRIPTION

Figure 1:
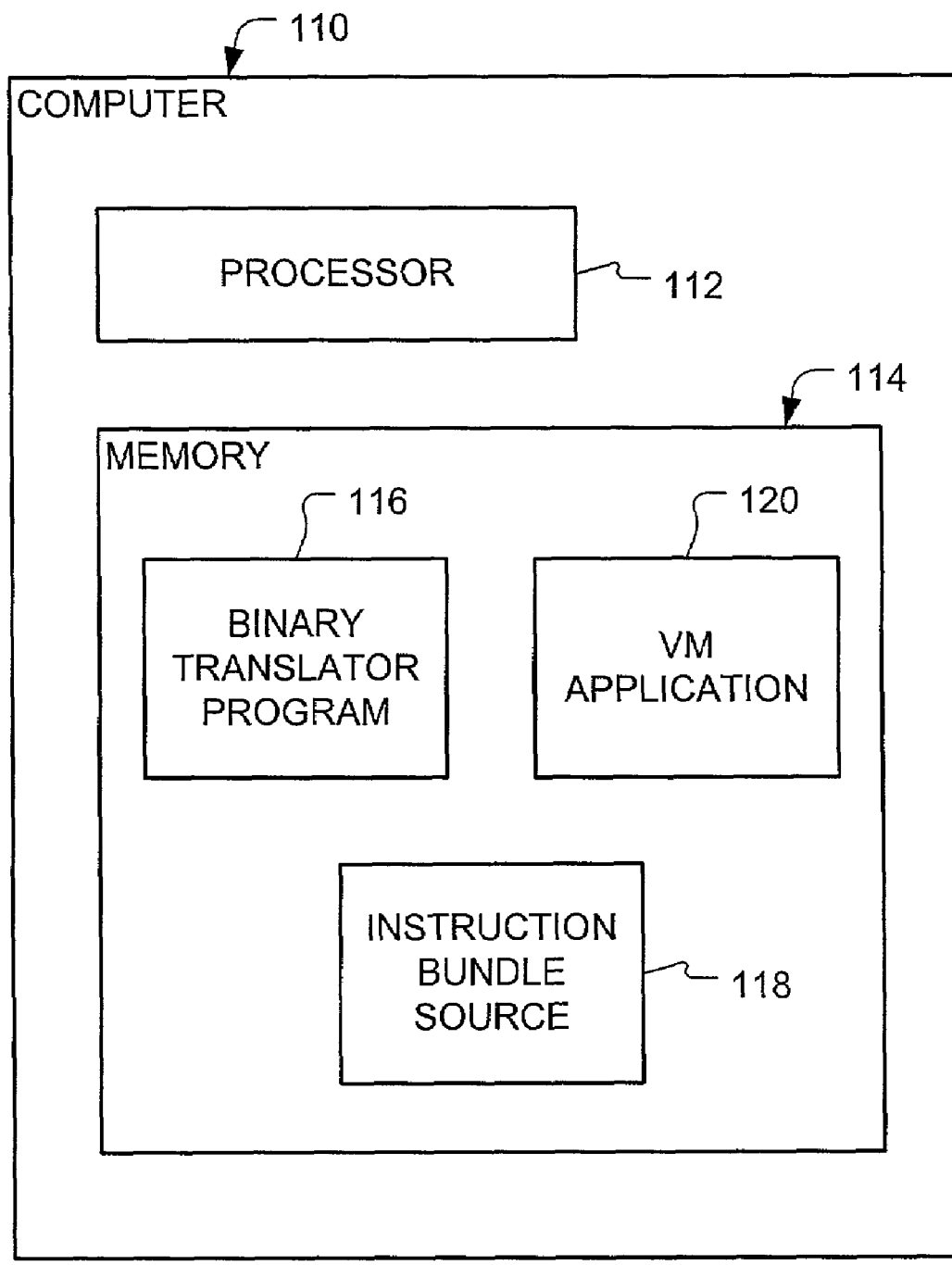
FIG. 1 is an illustration of a computer for processing an instruction stream in accordance with an embodiment of the present invention.

As shown in FIG. 1 for purposes of illustration, the present invention is embodied in a computer 110 including a processor 112 and memory 114. The processor 112 may be an EPIC processor, a VLIW processor, or any the processor that processes a stream of instructions containing explicit information about parallel execution of instructions or allocation of instructions to execution units.

The memory 114 stores a binary translator program 116, which may be supplied to the computer 110 by any available means (e.g., network connection, optical disk). When executed the program 116 causes the processor 112 to unbundle instructions in a first instruction stream, translate certain unbundled instructions, and rebundle the instructions into a second instruction stream. The unbundling, translating and rebundling may be performed in linear-time complexity.

Linear time complexity means that the time taken to process an instruction stream grows linearly with the number of instruction bundles being processed. As a result, the translation can be implemented in real time.

The computer 110 will now be described in connection with EPIC instructions and an IA-64 processor (which is a type of EPIC processor). EPIC instruction streams are sequences of instruction "groups", rather than sequences of instructions as with the RISC and CISC architectures. EPIC architectures specify how instructions in a same group are allowed to execute in parallel.

The processor 112 may access the first instruction stream from memory 114. For example, the first instruction stream may be accessed from an instruction source 118 such as an application or operating system. The first instruction stream contains "bundles." As used in IA-64 terminology, a bundle specifies instructions, an associated execution unit for each instruction, and whether the instruction is followed by a stop. An execution unit refers to a part of the processor 112 that is capable of performing certain types of operations. The IA-64 architecture defines I (integer), M (memory), F (floating-point) and B (branch) units. For example, a branch instruction is executed on a B unit, while a memory load or store is executed on an M unit. A "stop" refers to the end of an instruction group. The 'stops' are used to indicate dependencies in the first instruction stream.

Unbundling the first instruction stream includes reading the instruction bundles in the first instruction stream and decoding the information encoded in each bundle. An IA-64 bundle can contain up to three instructions. Unbundling of a single bundle can therefore create as many as three instructions.

For each unbundled instruction, the processor 112 records the instruction, the execution unit that the instruction is scheduled to execute, and whether the instruction is followed by a stop. The processor 112 may record additional information, such as the original address of the bundle, virtual-memory related information, etc. The processor 112 may also record information for further processing, such as bit-masks describing register usage. The processor 112 may record these items by creating a list.

Unbundling may be terminated if a specific event occurs. The termination is not limited to any particular event, but may be based on maximum number of bundles, presence of specific instructions such as branches, exhaustion of binary-translator resources, etc.

Translating the instructions in linear time complexity could include the following without limitation: replacing instructions with different instructions or sequences of instructions; replacing privileged instructions with non-privileged instructions; replacing slower-executing instructions with faster-executing instructions; and removing unnecessary instructions such as no-operation (nop) instructions.

Replacing privileged instructions with non-privileged instructions has advantages when the computer 110 runs a virtual machine (VM) application 120. The VM application 120 creates an environment in which additional operating systems can be run. A virtual machine can be used to run applications for one operating system on top of a different operating system for the same processor. For instance a Windows operating system and associated Windows applications can be run in an environment created by a virtual machine running on a Linux operating system. If the operating system in the virtual machine tries to execute privileged instructions, faults will occur. These faults are expensive from a time standpoint. To replace the privileged instructions, the virtual machine is used to control the translation. The underlying operating system provides the first stream to the virtual machine, and the virtual machine replaces certain privileged instructions are with sequences of non-privileged instructions. Replacing the privileged instructions with sequences of non-privileged instructions can minimize the number of privilege faults.

Replacing slower-executing instructions with faster-executing instructions and removing unnecessary instructions can increase execution speed of the computer 110 and take advantage of information that is only available when a program is actually running. Such information may include memory access patterns, the most frequently taken branches, and the processor model.

Bundling" and "rebundling" include the encoding of instructions in instruction groups. If an instruction list is used to keep track of the unbundled instructions, then for every instruction in the list, an attempt is made to insert the instruction in the current bundle. If the instruction and the bundle being built match processor-specific bundling constraints, the instruction is inserted in the bundle. If not, a no-operation instruction is inserted instead in the bundle, and the instruction is inserted in a new bundle. The rebundling ensures that the translated instructions contains at least one stop where the original code contained a stop. Thus dependency between operations and therefore the semantics of the original program are preserved.

As soon as a bundle is full, it is written to memory. The rebundling is terminated when the instruction list is exhausted. Rebundling may be terminated upon application-specific events, such as running out of registers for instruction translation.

IA-64 bundling constraints include valid bundle templates. Available types of IA-64 templates include MII, MII-, MI-I, MI-I-, MLX, MLX-, MMI, MMI-, M-MI, M-MI-, MFI, MFI-, MMF, MMF-, MIB, MIB-, MBB, MBB-, BBB, BBB-, MMB, MMB-, MFB, MFB-, where M denotes a memory execution unit, I an integer execution unit, B a branch execution unit, and F a floating-point execution unit. A dash (-) indicates a stop. For instance, a bundle can contain two M units and an I unit instruction, or one M unit instruction and two I units, but not three M units or three I units (since there are no MMM or III bundle templates). If three consecutive M unit instructions occur in the instruction list after translation, then no-operations are inserted in the templates during rebundling.

The unbundling, translation and rebundling may be performed in linear time complexity because upper bounds can be found for the number of operations required to (1) decode a single bundle, (2) add a single unbundled instruction to the list, (3) compute register allocation information for a single instruction, (4) translate a single unbundled instruction, and (5) rebundle a single translated instruction. As long as there is an upper bound to the number of translated instructions for a single incoming unbundled instruction, then there is an upper bound to the total number of operations required to translate a single bundle, and the number of operations grows linearly with the number of bundles being translated.

The computer 110 is not limited to performing translation in linear time complexity. The computer 110 may perform translation of unbundled instruction streams that require non-linear complexity. For example, the computer 110 can re-arrange instructions to improve performance and remove branches from the most frequently executed path in the instruction stream.

Instruction translation may be performed in real time. In real-time mode, the instruction stream may be fetched from memory 114, for example, by executing an application or operating system. Real-time mode allows the translation to be invoked as part of the execution of the first instruction stream. Instruction groups from the first instruction stream are unbundled, translated and rebundled, and the rebundled instructions are executed by the processor 112.

Instruction translation may be performed in batch mode. In batch mode, the instruction bundles in the first instruction stream are fetched from a disk image or any other form of persistent storage, unbundled, translated, and stored to a new disk image or persistent storage. Translation in batch mode preserves the result of translation for multiple executions. Translation in batch mode can be preferred when more complicated forms of translation or transformations on the instructions are necessary, notably when the transformations have non-linear complexity and when the translation time becomes significant compared to the execution time.

Reference is now made to FIG. 2, which shows an embodiment of a method of processing an instruction stream having bundled instructions. Examples of the method will be described in connection with an IA-64 processor and an EPIC instruction stream.

Bundles of instructions are read (210), and the bundles and unbundled into individual instructions (212). The unbundled instructions are decoded into binary patterns (214), and an instruction list is created (216). The instruction list allows for sequential processing of the decoded instructions.

The list is traversed in two passes. As the list is traversed during the first pass, the instructions are examined sequentially, one at a time to determine register usage since the replacement instruction sequences may require registers to hold temporary values such as the addresses of memory locations and the result of an arithmetic operation being performed (218). An available register is a register holding an inconsequential value when an instruction is executed. For example, a register might be available because its value is overwritten by a following instruction before being read. Available registers can be corrupted by a replacement sequence without changing the outcome of the complete instruction sequence in a detectable manner.

In order to determine available registers, the register allocation process loops over the instruction list backwards. If an unconditional instruction writes to a register, then the register is marked as available. If an instruction reads from a register, then the register is marked as non-available. The set of available registers is then recorded for the current instruction, and the process repeats until the first instruction. For register allocation purposes, branch instructions may be regarded as reading and writing all registers. Additional information on register usage may also be determined from software conventions.

If an available register cannot be found (for example, the number of temporary values required to translate an instruction is larger than the number of available registers), then registers can be "borrowed." Registers may be borrowed by using memory (e.g. a stack) to spill current register values before the instruction is translated, and then filling the spilled register values back immediately after the translated instruction. Another approach involves spilling some registers once at the beginning of the instruction stream, and then filling the registers on exit from the sequence. Since registers are spilled and filled only once for the whole sequence, memory is accessed less frequently and higher performance of the translated code results. The registers being spilled should not otherwise be written by the instruction sequence, since the value that will be restored from memory will be the value saved at the beginning of the sequence. The set of borrowable registers shrinks as the instruction sequence grows, and running out of borrowable registers may be one of the terminating events for the unbundling.

During the second pass, certain instructions are translated (220). Certain instructions are replaced with different sequences of instructions, certain instructions may be removed, certain instructions may be added to the list, etc. The selection of the translations applied to a particular instruction depends on the desired result of the translation. Some replacement instructions might be faster to execute, while other replacement instructions might execute non-privileged operations. The replacement instructions should use available registers to avoid the cost (e.g., time) of accessing memory.

The translated instructions are rebundled (222). Relative position of the instructions is unchanged, order of instructions in the stream is preserved, and rebundling rules (constraints) of the processor are followed.

As an example, consider the IA-64 code fragment listed in Table 1. This code fragment could be part of operating system code. By convention, text following // is used for comments.

TABLE I

| | | |
|---|---|---|
| rsm | 0x8000 | // "Reset System Mask", a privileged instruction |
| add | r7 = r8,r9 | // Add r8+r9 and store result in r7 |
| mov | r2 = 10 | // Initialize register r2 to value 10 |
| mov | r3 = 20 | // Initialize register r3 to value 20 |
| ;; | | // Stop (end of an instruction group) |
| mov | r4 = 30 | // Initialize register r4 to value 30 |
| cmp.eq p3,p7 = r0,r5 | | // Compare r0 and r5, result in p3 and p7 |
| mov | r8 = r5 | //Copy R5 into R8 |

The 'rsm' instruction is an M unit instruction. The 'mov', 'add' and 'cmp' instructions can be M unit or I unit instructions. A possible encoding for the above using the available IA-64 bundle templates is a first MII bundle followed by an M-MI bundle. There is a leftover 'mov' instruction, which can be encoded in an MMI bundle for example.

The instructions are unbundled, and an instruction list is generated. The comments in Table II indicate the list of instructions.

TABLE II

| | | |
|---|---|---|
| rsm | 0x8000 | // M unit, no Stop |
| add | r7 = r8,r9 | // M or I unit, no Stop, reads R8 and R9, writes R7 |
| mov | r2 = 10 | // M or I unit, no Stop, writes R2 |
| mov | r3 = 20 | // M or I unit, followed by a Stop, writes R3 |
| mov | r4 = 30 | // M or I unit, no Stop, writes R4 |
| cmp.eq p3,p7 = r0,r5 | | // M or I unit, no Stop, reads R0 and R5, // writes P3 and P7 |
| mov | r8 = r5 | // M or I unit, no Stop, reads R5, writes R8 |

Register allocation is then performed. The list is scanned backwards to identify available registers. The comments in Table III indicate the available registers.

TABLE III

| | | |
|---|---|---|
| mov | r8 = r5 | // +r8: r8 available |
| cmp.eq p3,p7 = r0,r5 | | // +p3, +p7: r8, p3, p7 available |
| mov | r4 = 30 | // +r4: r4, r8, p3, p7 available |
| mov | r3 = 20 | // +r3: r3, r4, r8, p3, p7 available |
| mov | r2 = 10 | // +r2: r2, r4, r8, p3, p7 available |
| add | r7 = r8,r9 | // +r7, −r8, −r9: r2, r4, r7, p3, p7 available |
| rsm | 0x8000 | // r2, r4, r7, p3, p7 available |

Assuming that the translation objective is to remove privileged operations to avoid faults while executing operating system code in a virtual machine, the 'rsm' operation, which clears bits in privileged register PSR, can be replaced with bit-clear operations on a virtual machine PSR stored in memory. A possible sequence translating the 'rsm' instruction is given in Table IV.

TABLE IV

| | | |
|---|---|---|
| movl | tmp1=virtual_PSR | // Compute address of virtual PSR |
| mov | tmp2=0x8000 | // Initialize tmp2 with mask of bits to clear |
| ;; | | // Stop, since the following load depends // on tmp1 |
| ld8 | tmp3=[tmp1] | // Load virtual PSR from memory |
| ;; | | // Stop, since following computation // depends on load |

TABLE IV-continued

| | | |
|---|---|---|
| andcm | tmp3=tmp2,tmp3 | // "And complement" (clear bits) |
| ;; | | // Stop, since the following store depends // on computation |
| st8 | [tmp1]=tmp3 | // Store virtual PSR to memory |
| ;; | | // Stop, since tmp3 might be overwritten // below |

Registers r2, r4 and r7 are available at that point (as determined during register allocation), therefore register r2 can be selected for tmp1, r4 for tmp2, and r7 for tmp3. Resulting is sequence of instruction (stops have been added to instructions) given in Table V.

TABLE V

| | | |
|---|---|---|
| movl | r2=virtual_PSR | // LX unit |
| mov | r4=0x8000 | // M or I unit, Stop |
| ld8 | r7=[r2] | // M unit, Stop |
| andcm | r7=r4,r7 | // M or I unit, Stop |
| st8 | [r2]=r7 | // M unit, Stop |

Other instructions are not privileged and cannot cause a privilege fault, so they are not translated. The resulting instruction list after translation is given in Table VI.

TABLE VI

| | | |
|---|---|---|
| movl | r2=virtual_PSR | // LX unit |
| mov | r4=0x8000 | // M or I unit, Stop |
| ld8 | r7=[r2] | // M unit, Stop |
| andcm | r7=r4,r7 | // M or I unit, Stop |
| st8 | [r2]=r7 | // M unit, Stop |
| add | r7 = r8,r9 | // M or I unit |
| mov | r2 = 10 | // M or I unit |
| mov | r3 = 20 | // M or I unit, Stop |
| mov | r4 = 30 | // M or I unit |
| cmp.eq p3,p7 = r0,r5 | | // M or I unit |
| mov | r8=r5 | // M or I unit |

The selection of available registers to hold temporary values ensures that the result of the program is unchanged. For instance, the movl instruction changes the value of r2 compared to what it would be in the original program. But since the value is overwritten by the 'mov r2=10' instruction, the value of r2 at the end of the sequence (10 in that case) is unchanged. Register r8, on the other hand, would not be used since it was read in the original sequence before being written to.

The instructions are rebundled one at a time, using valid bundle templates. One possible method is to compute a set of available bundle templates (which starts with all available bundle templates), and to eliminate invalid bundle templates as new instructions are added to the bundle. When the set of available bundle templates becomes empty, the current bundle is written to the second instruction stream.

Since the 'movl' instruction, for instance, can only be stored in the 'LX' part of an MLX template, only the MLX template or the MLX-template may be used. Since there is no stop, the MLX template is preferred. A no-operation (nop) instruction would be inserted before the movl instruction, and the following MLX bundle would be generated:

| | | |
|---|---|---|
| nop.m | | // M |
| movl | r2=virtual_PSR | // LX |

The 'mov r4=0x8000' instruction is followed by a stop. Thus the following templates may be used: MII-, MI-I, MMI-, M-MI, M-MI-, MFI-, MMF-, MIB-, MMB-, MFB-. The 'ld8 r7=[r2]' instruction is an M instruction and is followed by a stop. Thus only the template M-MI- may be used. In order to make sure that the instruction is followed by a stop, a nop instruction is inserted, which results in the following M-MI- bundle being written to the second instruction stream and a new bundle started:

| | | |
|---|---|---|
| mov | r4=0x8000 | // M |
| ;; | | // Stop |
| ld8 | r7=[r2] | // M |
| nop.i | | // I |
| ;; | | // Stop |

The same process repeats, until all instructions have been bundled. A possible bundle sequence is given in Table VII.

The present invention is not limited to a computer that performs translation and also executes the translated instruction stream. For example, a first machine may be used to perform the translation and supply the translated stream to a second computer, and the second machine may be used to execute the translated instruction stream.

The present invention is not limited to the binary translation of an instruction stream containing explicit information about instruction dependencies or execution units, and encoding such information using separate template bits in the bundle. Certain processors may use positional encoding of execution units, where different bits in an instruction word encode instructions for different execution units. Separate bits or special instruction encodings may be used to specify instruction dependencies. The present invention can be applied to such encodings.

The present invention is not limited to the specific embodiments described and illustrated above. Instead, the present invention is construed according to the claims that follow.

TABLE VII

| | | |
|---|---|---|
| nop.m | | // M |
| movl | r2=virtual_PSR | // LX |
| mov | r4=0x8000 | // M |
| ;; | | // Stop |
| ld8 | r7=[r2] | // M |
| nop.i | | // I |
| ;; | | // Stop |
| andcm | r7=r4,r7 | // M |
| ;; | | // Stop |
| st8 | [r2]=r7 | // M |
| nop.i | | // I |
| ;; | | // Stop |
| add | r7 = r8,r9 | // M |
| mov | r2 = 10 | // I |
| mov | r3 = 20 | // I |
| mov | r4 = 30 | // M |
| cmp.eq p3,p7 = r0,r5 | | // M |
| mov | r8 = r5 | // I |

The invention claimed is:

1. A method of processing a first instruction stream, the method comprising:
   unbundling groups of instructions in the first instruction stream into unbundled instructions;
   translating at least some of the unbundled instructions; and
   performing instruction group rebundling with the translated instructions, wherein the rebundling includes puffing instructions back into a bundle to ensure that order of instructions is preserved, and that processor-specific bundling constraints are followed, and wherein a number of operations are performed for unbundling, translating and rebundling, the number of operations upperbounded by a linear function of a number of instructions or instruction bundles being translated.

2. The method of claim 1, wherein the unbundling, translating and rebundling are performed in linear time complexity.

3. The method of claim 1, wherein the instructions in the first instruction stream are unbundled from groups to individual instructions, and wherein both translated and non-translated individual instructions are rebundled into groups.

4. The method of claim 1, wherein the unbundling includes generating a list of instructions containing information about execution units and dependency between instructions.

5. The method of claim 1, wherein the unbundled instructions are represented as bit patterns.

6. The method of claim 1, wherein the translating includes adding and removing instructions.

7. The method of claim 1, wherein the translating includes replacing certain unbundled instructions with alternative instructions.

8. The method of claim 1, the translating includes replacing certain privileged instructions with non-privileged instructions.

9. The method of claim 1, further comprising using a virtual machine to control the translation; and using an operating system to provide the first instruction stream to the virtual machine, the virtual machine removing certain privileged instructions to minimize privilege faults.

10. The method of claim 1, wherein the unbundling includes generating a list of execution units; scanning the list during a first pass to identify available registers; and scanning the list during a second pass to add and remove certain instructions.

11. The method of claim 1, wherein the translating includes using unbundled instructions to identify available registers.

12. The method of claim 11, wherein the translating further includes adding instructions that use certain identified available registers.

13. The method of claim 11, wherein the translating further includes borrowing a register if no available registers are identified.

14. The method of claim 1, wherein certain instructions in the instruction stream are translated in non-linear time complexity.

15. The method of claim 1, wherein the bundling constraints include bundle templates.

16. The method of claim 15, wherein the templates represent information about available execution units and dependency between instructions.

17. The method of claim 1, wherein the unbundling includes generating a list of stops; and wherein the rebundling ensures that the translated instructions contain at least one stop where the original code contained a stop, whereby dependencies between instructions is preserved.

18. The method of claim 17, wherein bits encoding the template are distinct from bits encoding the rebundled instructions.

19. The method of claim 1, wherein the unbundling includes generating an instruction list to keep track of the unbundled instructions; and wherein the rebundling includes attempting to insert each instruction in a current bundle.

20. The method of claim 1, wherein rebundled instructions are assigned to compatible execution units; and wherein dependencies between instructions are preserved.

21. The method of claim 1, wherein a set of execution units and dependencies is computed during translation, the set containing all valid combinations of execution units and instruction dependencies; wherein unbundled instructions are processed incrementally; and wherein adding a new instruction restricts the set of available execution units and instruction dependencies.

22. The method of claim 1, wherein a computer is used to perform the unbundling and translation.

23. The method of claim 1, wherein the unbundling and translation are performed in real time.

24. The method of claim 1, wherein the instruction streams include EPIC instruction bundles for an IA-64 processor.

25. Apparatus comprising a processor programmed to unbundle instruction groups in an instruction stream; translate certain unbundled instructions; and rebundle translated and non-translated instructions into rebundled instruction groups; wherein the rebundling does not change relative position of the instructions, preserves order of instructions in the stream, and follows process-specific rebundling constraints, and wherein said processor is configured to perform a number of operations to unbundle said instruction groups, translate said certain unbundled instructions and perform said rebundling, the number of operations upper-bounded by a linear function of a number of said unbundled instructions being translated.

26. The apparatus of claim 25, wherein the unbundling, translating and rebundling are performed in linear time complexity.

27. The apparatus of claim 25, wherein the unbundling includes generating a list of instructions containing information about execution units and dependency between instructions.

28. The apparatus of claim 25, wherein the translating includes adding and removing instructions.

29. The apparatus of claim 25, wherein the processor is further programmed with an operating system and a virtual machine; the operating system providing the instruction stream to the virtual machine; the virtual machine controlling the translation to replace certain privileged instructions with unprivileged instructions.

30. The apparatus of claim 25, wherein the unbundling includes generating a list of execution units; scanning the list during a first pass to identify available registers; and scanning the list during a second pass to add and remove certain instructions.

31. The apparatus of claim 25, wherein the translating includes using unbundled instructions to identify available registers.

32. The apparatus of claim 31, wherein the translating further includes adding instructions that use certain identified available registers.

33. The apparatus of claim 31, wherein the translating further includes borrowing a register if no available registers are identified.

34. The apparatus of claim 25, wherein certain instructions in the instruction stream are translated in non-linear time complexity.

35. The apparatus of claim 25, wherein the constraints include bundle templates.

36. The apparatus of claim 25, wherein the unbundling includes generating a list of stops; and wherein the stops are used during rebundling to preserve dependencies between instructions.

37. The apparatus of claim 25, wherein a set of execution units and dependencies is computed during translation, the set containing all valid combinations of execution units and instruction dependencies; wherein unbundled instructions are processed incrementally; and wherein adding a new instruction restricts the set of available execution units and instruction dependencies.

38. The apparatus of claim 25, wherein the processor is an IA-64 processor and the instruction stream includes EPIC instruction bundles.

39. Apparatus comprising:
a processor;
first means for providing a first instruction stream containing bundled instructions;
second means for unbundling instructions in the first instruction stream;
third means for translating certain unbundled instructions, wherein the third means includes a virtual machine for controlling translation; and
fourth means for rebundling the instructions such that instructions are put back into a bundle to ensure that order of instructions is preserved, and that processor-specific bundling constraints are followed; and wherein the number of operations required to perform said unbundling of said instructions, said translating of said certain unbundled instructions and to perform said rebundling, is upper-bounded by a linear function of a number of said certain unbundled instructions being translated.

40. The method of claim 1, wherein the unbundling, the translating and the rebundling are performed with native instructions.

41. The method of claim 1, wherein the instruction rebundling includes rebundling translated and non-translated instructions according to specific templates.

* * * * *

UNITED STATES PATENT AND TRADEMARK OFFICE
CERTIFICATE OF CORRECTION

PATENT NO. : 7,577,944 B2
APPLICATION NO. : 10/100525
DATED : August 18, 2009
INVENTOR(S) : Christophe de Dinechin It is certified that error appears in the above-identified patent and that said Letters Patent is hereby corrected as shown below:

In column 7, lines 65-66, in Claim 1, delete "puffing" and insert -- putting --, therefor.

In column 8, line 23, in Claim 8, delete "the" and insert -- wherein the --, therefor.

Signed and Sealed this

Eleventh Day of May, 2010

David J. Kappos
*Director of the United States Patent and Trademark Office*